United States Patent [19]

Haug

[11] Patent Number: 5,062,742

[45] Date of Patent: Nov. 5, 1991

[54] ANGULAR INTERLOCK FOR THE REPLACEABLE WAFER OF A SHAPER CUTTER

[75] Inventor: Edward W. Haug, Rockford, Ill.

[73] Assignee: Pfauter-MAAG Cutting Tools Limited Partnership, Rockford, Ill.

[21] Appl. No.: 528,241

[22] Filed: May 24, 1990

[51] Int. Cl.$^5$ .............................................. B23F 21/28
[52] U.S. Cl. ........................................ 407/28; 407/104
[58] Field of Search ...................................... 407/21–29, 407/14–19, 32, 35, 52, 104

[56] References Cited

U.S. PATENT DOCUMENTS

| | | | |
|---|---|---|---|
| 1,221,432 | 4/1917 | Fellows | 407/28 |
| 2,171,325 | 8/1939 | Hawgood | 407/27 |
| 3,740,807 | 6/1973 | Getts | 407/101 X |
| 4,364,693 | 12/1982 | Lindsay | 407/104 |
| 4,397,592 | 8/1983 | Erickson | 407/104 X |
| 4,576,527 | 3/1986 | Haug | 407/28 |
| 4,629,377 | 12/1986 | Tlaker et al. | 407/28 |
| 4,632,606 | 12/1986 | Lagerberg | 407/104 |
| 4,673,317 | 6/1987 | Haug | 407/28 |

Primary Examiner—Gary F. Paumen
Assistant Examiner—Julie R. Daulton
Attorney, Agent, or Firm—Leydig, Voit & Mayer, Ltd.

[57] ABSTRACT

A shaper cutter includes a body having teeth formed around its periphery and further includes a thin wafer disposed against a conical face of the body and formed with peripheral cutting teeth which lie against the teeth of the body, the teeth of the wafer serving to cut a workpiece and being backed by the teeth of the body. As the wafer is clamped to the body, it is flexed from a flat condition to a deflected condition in which the wafer lies against and conforms to the conical face of the body. To hold the deflected wafer in a rigidly fixed angular position on the body, a pin which is anchored to the body projects into a hole in the wafer. The hole is specially located and configured to coact with the pin to orient the wafer angularly relative to the body prior to deflection of the wafer and then to establish substantial areas of surface contact with the pin after deflection of the wafer. The substantial surface contact areas reduce deformation at the interface of the hole and the pin and thus reduce angular shifting of the wafer when tangential cutting forces are imposed on the wafer and serve to maintain the wafer in a rigidly fixed angular position relative to the body.

11 Claims, 2 Drawing Sheets

ANGULAR INTERLOCK FOR THE REPLACEABLE WAFER OF A SHAPER CUTTER

BACKGROUND OF THE INVENTION

This invention relates to a cutter for a shaper and, more particularly, to a cutter for cutting irregular shapes such as the teeth of a gear. Customarily, such cutters include a body with a plurality of teeth spaced angularly around the periphery of the body. The ends, sides and roots of the teeth are inclined radially inwardly from the face of the body so that the edges of the teeth constitute the cutting edges of the cutter. Frequently, the cutter is surface coated as with a thin film of titanium nitride.

When the cutting edges of most present commercially used shaper cutters become dull, they are resharpened by grinding the face of the tool and hence the faces of the teeth. Such grinding presents a number of difficulties. My U.S. Pat. No. 4,576,527 discloses a shaper cutter which overcomes these difficulties. In the cutter disclosed in that patent, teeth with cutting edges are formed on a thin flexible wafer which is attached to and conforms with the teeth and face of a tool holder, the latter being basically the same as the cutting body of prior cutters and serving to back the cutting teeth of the wafer. When the cutting edges become dull, the thin wafer is simply removed and replaced with a new one. To attach the wafer to the body in conformity with the teeth and face thereof, provision is made of a clamping ring adapted to lie against the end face of the wafer. When a fastener is tightened, the clamping ring flexes the thin wafer into conformity with the tool body and clamps the wafer and the body in assembed relationship.

Even though the wafer is clamped to the body, means must be provided for anchoring the wafer in a precisely fixed angular position and for preventing the wafer from turning on the body. In the cutter of my prior patent, such turning is prevented by a cylindrical locating pin which projects through a hole in the clamping ring and into notches in the wafer and the body. This arrangement suffers, however, by virtue of the fact that the engagement between the pin and the flexed or deflected wafer is, for all practical purposes, only line contact around a maximum of 90 degrees of the circumference of the pin. Such limited contact between the pin and the edge of the hole in the wafer causes deformation in the interlock region when the wafer is subjected to tangential cutting forces. The deformation allows the wafer to shift angularly relative to the body to such an extent that the backup normally provided by the teeth of the body is lost, thereby leading to premature failure of the wafer.

In an effort to overcome the deficiencies of the angular interlock disclosed in the aforementioned patent, use has been made of an interlock comprising a special key of rectangular cross-section. Such a key fits into keyways in the wafer, the body and the clamping ring and, because of its special shape, has improved contact area with the deflected wafer so as to minimize angular creep of the wafer in most applications. This design, however, requires very tight tolerances to be held on the key and the keyways and thus is expensive to manufacture. Moreover, other design considerations dictate that the keyway in the wafer have sharp corners. This creates stress risers which, in some cases, has led to fracture of the wafers when the wafers are deflected.

SUMMARY OF THE INVENTION

The general aim of the present invention is to provide a relatively simple and inexpensive wafer angular interlock which locks the wafer directly to the tool body without need of locking into the clamping ring, which includes comparatively large contact areas to reduce angular deflection of the interlock and angular creep of the wafer, which is located in close radial proximity to the wafer teeth to further reduce deflection of the interlock, which avoids high stress areas that promote fracture of the wafer, and which enables relatively quick and easy assembly of the wafer without need of special fixtures.

A more detailed object of the invention is to achieve the foregoing by providing an interlock formed by a simple, inexpensive and easily installed pin which is adapted to fit into a uniquely configured and located hole in the wafer. The configuration of the hole establishes large surface contact areas with the pin while the radial location of the hole reduces deflection of the contact areas.

In still a more specific sense, the invention resides in a wafer having a hole which is shaped and located so as to accept the interlock pin and orient the wafer angularly when the wafer is initially installed on the body in a flat condition and then to establish comparatively large surface contact areas with the pin when the wafer is subsequently flexed to its final deflected condition.

These and other objects and advantages of the invention will become more apparent from the following detailed description when taken in conjunction with the accompanying drawings.

DETAILED DESCRIPTION OF THE PREFERRED EMBODIMENT

Figure 1:
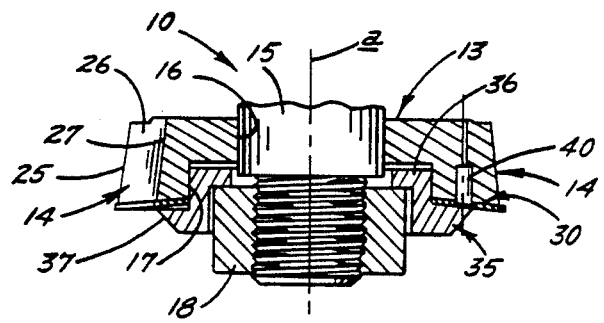
FIG. 1 is a fragmentary cross-section taken axially through a cutting tool incorporating the new and improved angular interlock of the present invention.
Figure 2:
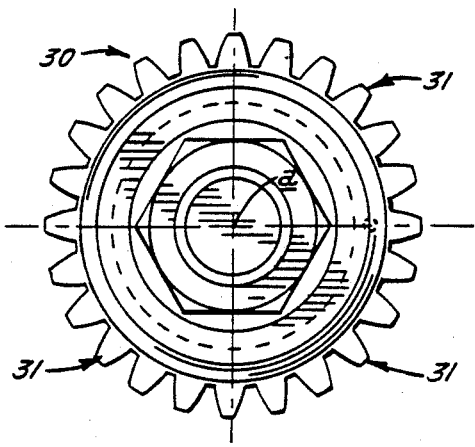
FIG. 2 is a bottom plan view of the tool shown in FIG. 1.

Although the invention is applicable to tools for cutting various workpieces of irregular shape, it is shown in the drawings for purposes of illustration as embodied in a shaper cutter 10 for cutting teeth on a workpiece such as a gear blank (not shown). The tool 10 includes a conical steel body 13 with a plurality of teeth 14 spaced angularly around the periphery of the body. The body is adapted to be mounted on a spindle adapter 15 and is adapted to be turned about the axis a of the spindle and the body while the work is turned in synchronism. During such turning, the tool is reciprocated longitudinally relative to the work and, during its downstroke, is brought into cutting engagement with the work to cut teeth in the work.

The tool body 13 has a central bore 16 which is received on the spindle adapter 15 in the manner disclosed in Haug U.S. Pat. No. 4,576,527. At its outer end, the tool body is counterbored as indicated at 17 to accommodate a locking nut 18 which is adapted to be threaded onto the lower end of the spindle adapter.

The edges of the teeth 14 of the body 13 are formed by the intersection of one face 24 of the body with the ends 25 and sides 26 of the teeth and with the roots 27. The face 24 is on the larger end of the conical body 13. The ends 25 and the roots 27 of the teeth 14 are inclined inwardly away from the face to provide a back or relief angle c (FIG. 3) which usually is between 4 and 8 degrees with 8 degrees generally being a suitable angle. The sides 26 of each tooth 14 converge toward each other as they progress upwardly so as to not rub the work during cutting.

Figure 3:
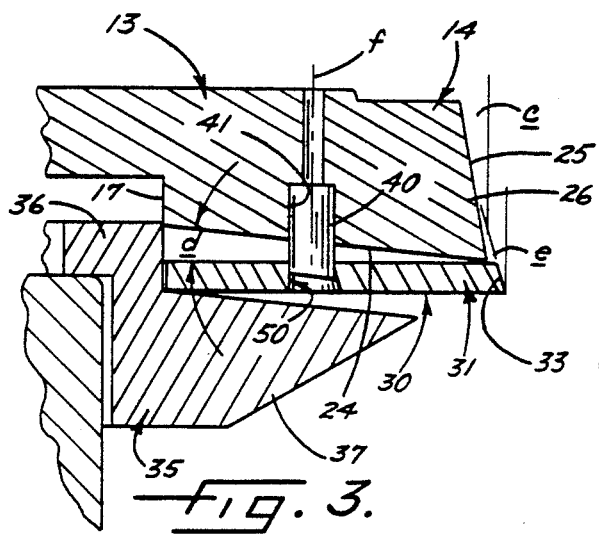
FIG. 3 is an enlarged view of a portion of the tool illustrated in FIG. 1 and shows the wafer just prior to deflection of the wafer to its flexed condition.

As shown most clearly in FIG. 3, the face 24 of the tool body 13 is frustoconical. While the face 24 could be convex, it preferably is concave and has a face angle d of between 5 and 10 degrees, 5 degrees being customary in most applications.

Figure 8:
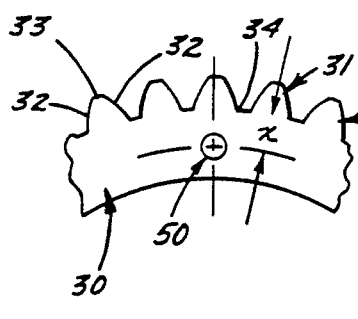
FIG. 8 is an enlarged fragmentary plan view of the wafer and shows the preferred location of the hole in the wafer.

To avoid the need of resharpening the cutting edges of the tool 10 when the cutting edges become dull, the cutting edges are formed on a thin metal wafer 30 which is fixed removably to and conforms to the shape of the face 24 of the body 13, the latter basically being the same body as that of a solid tool. The wafer is provided with a plurality of teeth 31 backed rigidly by the teeth 14 on the body 13 and is held removably against the face 24. When the cutting edges become dull, the wafer 30 is removed and replaced with another one. The sides 32 (FIG. 8) and the ends 33 of the teeth 31 of the wafer and the roots 34 in between are disposed relative to the plane of the wafer so that these edges generally match respectively the sides 26 and the ends 25 of the body teeth 14 and the roots 27. Preferably, the teeth on the wafer are larger than the teeth on the body so that a narrow margin (e.g., 0.010") of the ends, sides and roots of the wafer teeth extend slightly beyond the corresponding portions of the teeth on the body. The wafer preferably is made from a thin (e.g., about 0.050") sheet of tool steel which is subsequently hardened and coated with a thin film of titanium nitride. The aforementioned patent discloses a method by which the wafer may be formed.

Figure 4:
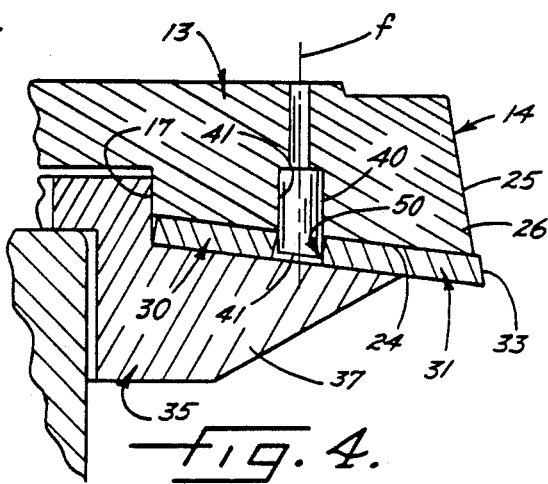
FIG. 4 is a view similar to FIG. 3 but shows the wafer after the latter has been fully deflected to its flexed condition.

The wafer 30 is secured to the tool body 13 by a clamping ring 35 (FIG. 3) formed by an annular bushing 36 and an integral radial flange 37. The bushing fits in the counterbore 17 of the spindle adapter 15 while the flange engages the wafer 30 just short of the roots 34 of the teeth 31 thereof. Clamping of the wafer is effected by tightening the nut 18 to draw the flange 37 of the clamping ring 35 into engagement with the wafer. As the nut is tightened, the flange 37 flexes the wafer from an initially flat condition (FIG. 3) and deflects the wafer until the wafer conforms to and lies in face-to-face engagement with the frustoconical face 24 of the body 13 as shown in FIG. 4. The upper surface of the flange extends parallel to the face 24 and thus the wafer is clamped tightly in its deflected condition between the flange and the body.

The ends 33 of the teeth 31 on the wafer 30 are formed at an angle e (FIG. 3) relative to the working face of the wafer so that these ends provide a back or relief angle when the wafer is secured to the face 24 of the body 13. In the specific cutter 10 which has been illustrated, the angle which the ends 33 make after the wafer is flexed against and is secured to the conical face 24 is the same as the angle c made by the teeth 14 on the body 13. Thus, the angle e is equal to the sum of the face angle d and the outside relief angle c so that, when the wafer is flexed, only the portion corresponding to the angle c remains relative to a line parallel to the axis a of the body 13. For example, if a face angle d of 5 degrees and an outside relief angle c of 8 degrees are used, the angle e formed on the ends 33 of the teeth 31 of the wafer 30 is 13 degrees. By forming the teeth 31 with the angle e, the sides 32 of the wafer teeth and the roots 34 are also angled back so that they do not rub the workpiece during cutting.

Flexing of the wafer 30 from the flat condition of FIG. 3 to the deflected position shown in FIG. 4 produces advantages as outlined in detail in my aforementioned patent but creates difficulty from the standpoint of effectively anchoring the wafer in a precisely fixed angular or circumferential position. In the cutter disclosed in my aforementioned patent, angular retention of the wafer is effected by a relatively simple and inexpensive cylindrical pin which fits through a notch in the wafer. In that arrangement, however, there is only line contact between the pin and the edge of the notch around a short circumferential length of the pin and, as a result, tangential cutting forces imposed on the wafer deform the angular interlock region and permit angular shifting of the wafer. While non-pin angular interlocks are available, such interlocks are expensive and also have other drawbacks.

The present invention contemplates a unique angular interlock which utilizes a relatively simple and inexpensive cylindrical pin 40 but which, at the same time, establishes substantial surface contact of the wafer with the pin and enables quick and easy installation of the wafer. Because of the substantial surface contact made possible by the interlock of the present invention, the deflected wafer is locked rigidly in a fixed angular position and does not shift angularly when subjected to heavy tangential cutting forces.

Figure 6:
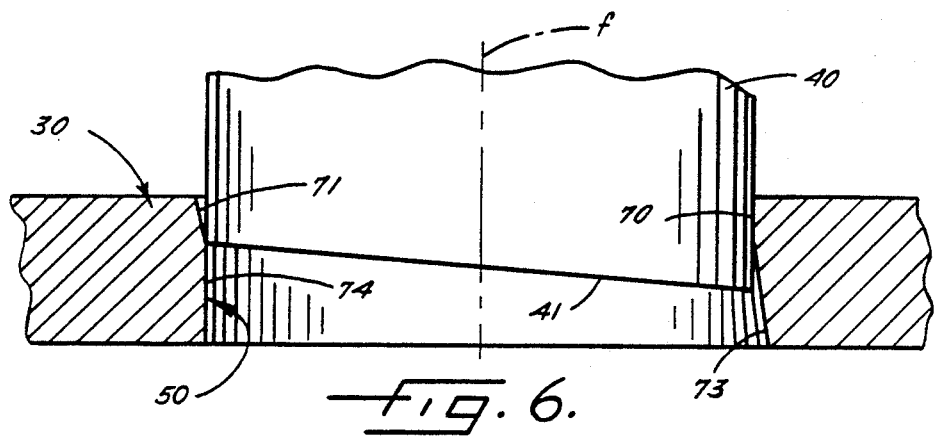
FIG. 6 is a greatly enlarged view showing the interlock pin received in the hole in the wafer while the wafer is in its flat condition.

The pin 40 of the invention is simply a short piece of cylindrical steel which, after being ground and hardened, is tightly pressed or otherwise secured in a hole 41 (FIG. 3) formed in the body 13 and opening out of the lower face 24 thereof. The preferred pin has a diameter of 3/16" and a length of ⅜" and is effective for use with wafers having outside diameters ranging from 4" to 7". The axis f of the pin extends parallel to the axis a of the body 13 and, for a purpose to be described subsequently, the lower end 41 (FIG. 6) of the pin is beveled at an angle which preferably corresponds to the face angle d of the body.

Figure 5:
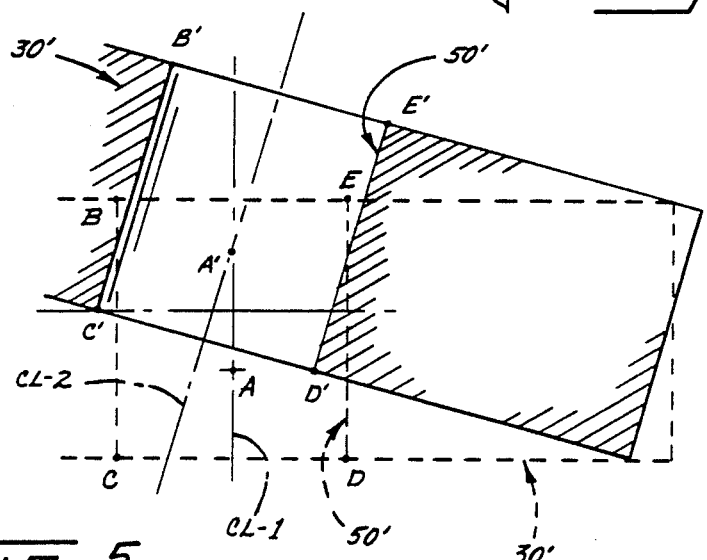
FIG. 5 is a diagrammatic view illustrating a wafer with a conventional cylindrical hole and illustrating the difference in position in the hole between the flat condition of the wafer and the deflected condition thereof.

To best explain the principles of the angular interlock of the invention, reference is made to FIG. 5 which shows a wafer 30' having a cylindrical hole 50' of the same diameter as the pin 40. The dotted line illustration of FIG. 5 shows the wafer in its natural flat condition while the solid line illustration shows the wafer as deflected when fully installed.

Referring to FIG. 5, it will be seen that the centerline CL-1 of the hole 50' of the flat wafer 30' intersects the centerline CL-2 of the same hole in the deflected wafer within the hole area of the deflected wafer. In other words, during deflection of the wafer, one specific point A on the centerline CL-1 moves parallel to the axis a of the tool 10 to a point A' on the centerline CL-1. Points B, C, D and E at the ends of the hole move laterally as well as axially to points B', C', D' and E', respectively, as the wafer is deflected. Due to the lateral movement of the ends of the hole, a cylindrical hole cannot accommodate an axially extending cylindrical pin of the same diameter as the wafer is deflected but instead will interfere with the pin.

Pursuant to the invention, the wafer 30 is formed with a hole 50 whose upper and lower ends are uniquely configured so as to avoid interference with the axially extending cylindrical pin 40 as the wafer is installed and deflected but, at the same time, to establish substantial areas of surface contact between the fully deflected wafer and the pin in order to anchor the wafer in a rigid angular position. The foregoing is achieved by forming the final configuration of the hole 50 as the wafer 30 is flexed from its initially flat condition to its fully deflected condition.

Figure 9:
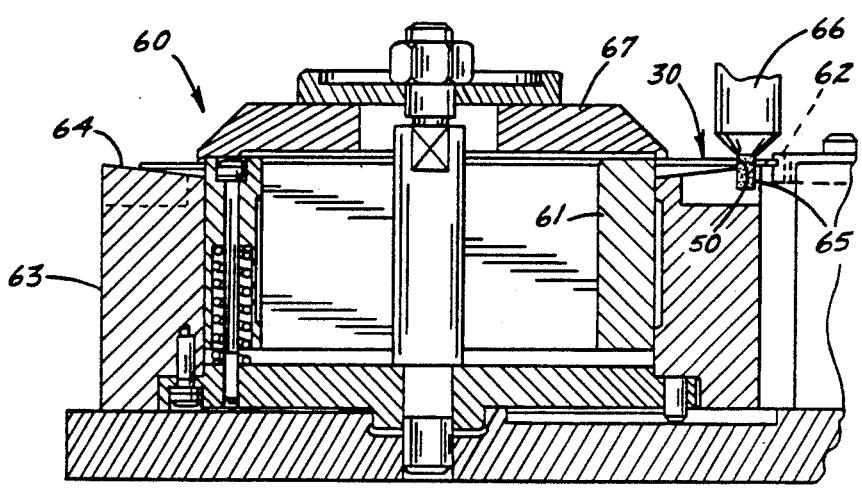
FIG. 9 is a cross-sectional view of a set up for forming the specially configured hole in the wafer.

More specifically, a cylindrical but rough-formed hole of appropriate diameter (e.g., 0.165" for a pin 40 with a diameter of 3/16") is initially formed through the wafer 30 parallel to the axis of the flat wafer and by conventional techniques such as drilling or laser cutting. Thereafter, the wafer is hardened and ground and is placed on a fixture 60 (FIG. 9) having a central mandrel 61 for locating the wafer radially and having a locator 62 for engaging one of the wafer teeth 31 and holding the wafer angularly. Surrounding the mandrel is an anvil 63 having a frustoconical upper face 64 which corresponds in shape to the face 24 of the body 13.

While the wafer 30 is resting in a flat condition on the anvil 63, a hone 65 (FIG. 9) made of cubic boron nitrite is rotated by a spindle 66 and is advanced through the rough-formed hole 50. The hone is cylindrical except for a slight lead-in taper at its lower end and, in this instance, has a diameter within the range of 0.1890" and 0.1895". The axis of the hone parallels the axis of the flat wafer 30.

The hone 65 is plunged through the hole 50 to enlarge the hole to a diameter corresponding to that of the hone. While the hone is in the hole, a pressure plate 67 (FIG. 9) is advanced to deflect the wafer 30 into engagement with the frustoconical face 64 of the anvil 63. As the wafer is deflected, the hone 65 is slowly reciprocated upwardly and downwardly in the hole 50.

By virtue of deflecting the wafer 30 while the hone 65 is being rotated in the hole 50, the hole is formed with an irregular and non-cylindrical configuration. Specifically, and referring to FIG. 6, the upper end portion of the hole 50 is formed with a cylindrical section 70 around approximately one-half of its circumference and with a downwardly beveled section 71 around the remainder of its circumference. In contrast, the lower portion of the hole is formed with an upwardly beveled section 73 which underlies the cylindrical section 70 and with a cylindrical section 74 which underlies the downwardly beveled section 71. In essence, the sections 71 and 73 are surfaces of a cylinder which is disposed at an angle equal to the angle d relative to the cylindrical sections 70 and 74, the latter two surfaces being on a common cylinder.

Figure 7:
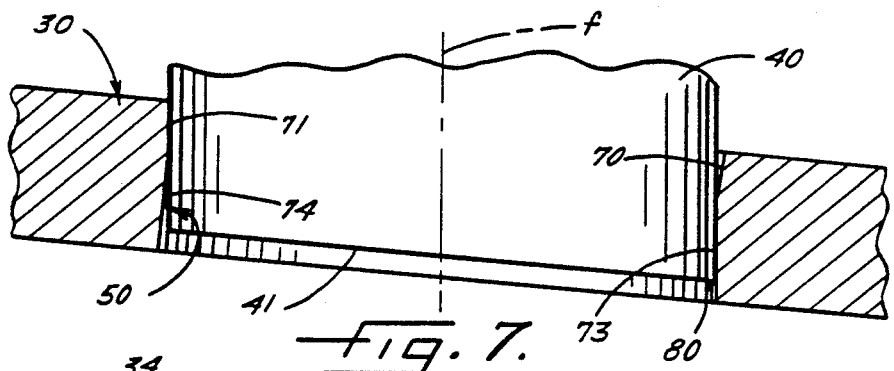
FIG. 7 is a view similar to FIG. 6 but shows the pin received in the hole in the wafer after the wafer has been deflected to its flexed condition.

With the hole 50 shaped as described above, it will accept the pin 40 when the wafer 30 is flat (see FIG. 6) and provides clearance to accommodate the pin as the wafer is deflected. As the wafer is deflected, the cylindrical sections 70 and 74 of the hole 50 move laterally away from the pin to allow the hole to accept the pin and, at the same time, the beveled sections 71 and 73 move toward and ultimately engage the pin (see FIG. 7). In the fully deflected position of the wafer, the upper beveled section 71 of the hole snugly engages the pin around approximately one-half its circumference while the lower beveled section 73 of the hole snugly engages the pin around the remainder of its circumference. When the wafer is fully deflected, the upper cylindrical section 70 is spaced from the pin around one side of the pin while the lower cylindrical section 74 is spaced from the pin around the other side thereof.

Figure 7A:
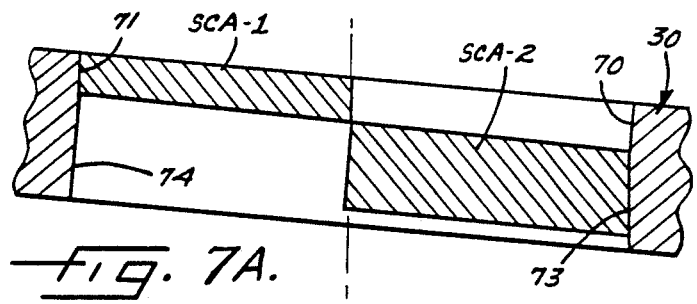
FIG. 7A is a diagrammatic view showing the angular and axial contact areas between the hole and the pin during a cutting operation.

Because of the snug surface-to-surface contact between the pin 40 and the beveled sections 71 and 73 of the hole 50 of the deflected wafer 30, there is comparatively low deformation around the hole region of the wafer when tangential cutting forces are imposed on the wafer. During a dynamic cutting operation, the tangential cutting forces tend to shift the wafer rearwardly relative to the pin and, as a result, the actual tangential cutting forces are resisted by the leading side of the pin while the trailing side of the pin and the adjacent side of the hole are free of pressure. FIG. 7A is a diagrammatic cross-sectional view of the hole 50 and shows the contact areas between the hole 50 and the leading side of the pin 40 during an actual cutting operation. The beveled section 71 of the hole 50 engages an upper portion of the pin around approximately 90 degrees of the circumference of the leading side of the pin and over a surface contact area which has been shaded and designated as SCA-1 in FIG. 7A. The beveled section 73 of the hole engages the lower end portion of the pin around the remaining 90 degrees of the leading side. The latter area of engagement is the shaded area designated as SCA-2 in FIG. 7A. Accordingly, during a dynamic cutting operation, there is surface contact between the hole and the pin around approximately 180 degrees of the leading side of the pin in order to reduce deformation at the interlock area and to keep the wafer rigidly locked in an angular position during the usable service life of the wafer.

As mentioned earlier, the lower end 41 of the pin 40 is beveled generally in accordance with the deflection angle d of the wafer 30. As a result, the pin may project into the hole 50 as far as possible without the lower end 41 of the pin engaging and interfering with the clamping ring 35.

To simplify installation of the wafer 30, it is important that the pin 40 project into the hole 50 while the wafer is resting flat on the clamping ring 35 and before the ring is tightened to deflect the wafer. As a result of the pin projecting into the hole 50 while the wafer is flat, the pin itself holds the wafer in a fixed angular position during tightening of the clamp and avoids the need of using a special fixture for angularly orienting the wafer during installation. Testing has shown that the extreme lower point 80 (FIG. 7) of the pin should project into the hole 50 a minimum distance of 0.010" when the wafer is flat in order to insure that the pin will keep the wafer oriented angularly as the clamping ring 35 is tightened.

It has been found that, with most cutters 10 up to five diametrical pitch, a minimum penetration of 0.010" of the pin 40 into the hole 50 when the wafer 30 is flat can be established if the axis of the hole is located a distance x (FIG. 8) of 3/16" from the root 34 of the wafer tooth 31 when the wafer is flat. Such location of the hole also places the hole close to the teeth to reduce the force exerted on the pin by the tangential cutting forces without placing the hole so close to the tooth as to lead to fracture of the wafer adjacent the hole. In extreme cases where the ratio of the outside diameter of the wafer to the inside diameter thereof leaves a distance of less than ⅜" from the inside diameter to the root 34 of the tooth, the hole 50 usually may be located midway between the inside diameter and the tooth root and a pin of smaller diameter may have to be used. For strength purposes, it is desirable to locate the axis of the hole along the centerline of a tooth 31.

While the irregularly shaped hole 50 has been specifically disclosed as being formed by the hone 65, other techniques such as electrical discharge machining may be used. Also, the pin 40 need not necessarily be cylindrical but could be elliptical or of other appropriate shape.

I claim:

1. A tool for cutting metal, said tool comprising an elongated body having a circular cross-section and a forward end surface, said forward end surface being generally frustoconical, a plurality of radially projecting teeth formed on the periphery of said body adjacent said forward end surface and spaced angularly around said body, a thin and flexible sheet metal wafer located forwardly of said forward end surface of said body and having a plurality of radially projecting cutting teeth spaced angularly around its periphery, the number of cutting teeth on said wafer being equal to the number of teeth on said body, each cutting tooth on said wafer being alined angularly with one of the teeth on said body, the cutting teeth on said wafer being larger at their ends, sides and roots than the corresponding teeth on said body whereby the cutting teeth on the wafer extend slightly beyond the ends, sides and roots of the teeth on said body, means for holding said wafer in a flexed condition and in rigid face-to-face conformity with said frustonical forward surface whereby the cutting teeth on said wafer are backed by the teeth on said body, and anti-rotation means for preventing said wafer from turning relative to said body, said anti-rotation means comprising a hole in said body and an alined circumferentially continuous hole in said wafer, a pin fixed within the hole in said body and projecting into the hole in said wafer, the hole in said wafer having first and second end portions, the hole in said wafer being shaped such that the first end portion of such hole engages said pin around one side of the pin and is spaced from the pin around the opposite side of the pin while the second end portion of such hole engages said pin around said opposite side of the pin and is spaced from the pin around said one side of the pin.

2. A tool as defined in claim 1 in which said wafer is flexed at a predetermined angle relative to the axis of said body, said pin extending generally parallel to the axis of said body, one end of said pin being disposed in the hole in said wafer and being beveled approximately at said predetermined angle, said one end of said pin terminating short of the forward face of said wafer.

3. A tool as defined in claim 1 in which said holding means comprise a clamping ring, said wafer being sandwiched between said body and said clamping ring, the hole in said wafer being covered by said clamping ring, and the end of the pin adjacent the clamping ring being beveled to prevent such end from engaging said clamping ring.

4. A tool as defined in claim 3 in which said wafer is flexed at a predetermined angle relative to the axis of said body, said pin extending generally parallel to the axis of said body, said end of said pin being beveled approximately at said predetermined angle.

5. A tool as defined in claim 1 in which said pin is generally cylindrical and extends substantially parallel to the axis of said body.

6. A tool as defined in claim 5 in which the first end portion of said hole includes a cylindrical section around approximately one-half its circumference and includes a beveled section around the remainder of its circumference, the second end portion of said hole including a cylindrical section alined generally circumferentially with said beveled section and including a reversely beveled section alined generally circumferentially with the cylindrical section of the first end portion of said hole, the sections of said second end portion of said hole each spanning approximately 180 degrees.

7. A tool as defined in claim 5 in which the forward end surface of said body is concave.

8. A tool as defined in claim 7 in which the ends, side and roots of the cutting teeth on said wafer are inclined inwardly toward said body to form back angles.

9. A tool as defined in claim 5 in which said pin is of sufficient length and said holes are located radially such that said pin projects into the hole in said wafer when said wafer is initially installed on said body but prior to said wafer being deflected toward said flexed condition.

10. A tool as defined in claim 9 in which a portion of said pin projects into the hole in said wafer a distance of at least 0.010" when said wafer is initially installed on said body but prior to said wafer being deflected toward said flexed condition.

11. A tool for cutting metal, said tool comprising an elongated body having a circular cross-section and a forward end surface, said forward end surface being generally frustoconical, a plurality of radially projecting teeth formed on the periphery of said body adjacent said forward end surface and spaced angularly around said body, a thin and flexible sheet metal wafer located forwardly of said forward end surface of said body and having a plurality of radially projecting cutting teeth spaced angularly around its periphery, the number of cutting teeth on said wafer being equal to the number of teeth on said body, each cutting tooth on said wafer being alined angularly with one of the teeth on said body, the cutting teeth on said wafer being larger at their ends, sides and roots than the corresponding teeth on said body whereby the cutting teeth on the wafer extend slightly beyond the ends, sides and roots of the teeth on said body, means for holding said wafer in a flexed condition and in rigid face-to-face conformity with said frustonical forward surface whereby the cutting teeth on said wafer are backed by the teeth on said body, and anti-rotation means for preventing said wafer from turning relative to said body, said anti-rotation means comprising a hole in said body and an alined circumferentially continuous hole in said wafer, a generally cylindrical pin fixed within the hole in said body and projecting into the hole in said wafer, the axis of said pin extending generally parallel to the axis of said body, the hole in said wafer having first and second end portions, the first end portion of said hole including a cylindrical section around approximately one-half its circumference and including a beveled section around the remainder of its circumference, the second end portion of said hole including a cylindrical section alined generally circumferentially with said beveled section and including a reversely beveled section alined generally circumferentially with the cylindrical section of the first end portion of said hole, the sections of said second end portion of said hole each spanning approximately 180 degrees.

* * * * *